(12) United States Patent
Li et al.

(10) Patent No.: US 6,526,015 B2
(45) Date of Patent: Feb. 25, 2003

(54) FLOATING FRAME FOR OPTICAL STORAGE DEVICE LOADING MECHANISM

(75) Inventors: Yong Li, Singapore (SG); Michael Anh Nguyen, Singapre (SG)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 08/974,252

(22) Filed: Nov. 19, 1997

(65) Prior Publication Data

US 2001/0040859 A1 Nov. 15, 2001

(30) Foreign Application Priority Data

Nov. 20, 1996 (SG) ............................................. 9611326

(51) Int. Cl.[7] ............................ G11B 33/08; G11B 23/03
(52) U.S. Cl. ...................................... 369/75.1; 369/263
(58) Field of Search .............................. 369/75.1, 75.2, 369/77.1, 77.2, 247, 263, 44.15

(56) References Cited

U.S. PATENT DOCUMENTS 5,166,918 A * 11/1992 Kamijo ...................... 369/77.1
5,583,834 A * 12/1996 Kanada et al. ............. 369/75.2
5,602,818 A * 2/1997 Kage et al. ................. 369/75.2

* cited by examiner

*Primary Examiner*—George J. Letscher
(74) *Attorney, Agent, or Firm*—Douglas S. Rupert; Wildman, Harrold, Allen & Dixon

(57) ABSTRACT

A floating frame for an optical disc loader. It includes a pivoting-type sub-chassis of 1-degree of freedom of movement. It is rigidly connected to a chassis without any floaters. Floaters are placed at the four corners of the chassis to support the entire loader. The floater has a wide mid-section and a narrow tip. Above the mid-section are upper slots, and below the mid-section are lower slots. The floater should preferably be made of flexible material such as rubber.

7 Claims, 3 Drawing Sheets

FLOATING FRAME FOR OPTICAL STORAGE DEVICE LOADING MECHANISM

FIELD OF THE INVENTION

The present invention relates to the field of optical storage or disc players, and in particular to a floating frame for optical disc loader to reduce the vibration experienced by an optical disc when rotating at high speeds.

BACKGROUND OF THE INVENTION

In the optical disc drive industry, there is an ever-increasing competition to increase the rate at which the data can be transferred from a disc to a peripheral device. In order to achieve the higher speeds, the drive must be able to spin the disc at correspondingly increased rotational speeds. So for instance, a 4×CD-ROM drive should be able to spin the CD-ROM disc about twice as fast as that of a 2×drive. With increased rotational speeds, however, the disc experiences increased vibration. This vibration, which increases exponentially with speed, is a serious problem which can significantly hinder the drive's performance. Intermittent data streaming, for example, is one such a problem where the drive is unable to read some of the data off the CD-ROM. This problem may make video applications inoperable, or may unduly slow down other applications due to extended error recovery time.

The main causes for the drive vibration are the high linear acceleration of the optical pickup unit and the eccentricity of the system. There are two sources for the eccentricity: the spindle turntable and the optical disc. The disc eccentricity is the major contributor to the drive's vibration and this problem becomes even more significant as drive speed increases.

To alleviate the vibration, virtually all of the current drives come with floating sub-chassis which supports the traverse mechanism. To achieve this, the floaters are placed at the key joints that join the sub-chassis to the main chassis. The floaters are typically made of flexible rubber or other similar material. By floating the sub-chassis some of the vibrations are absorbed by the floaters, thus dampening the overall vibrational effect on the traverse mechanism. Although this method has been relatively successful in reducing the vibration for the currently existing optical disc drives, as the disc are rotated at higher speeds, such as in the 12×drives, there is a greater need for a better dampen the vibration. In light of the continual evolution in the optical disc drives, there is clearly a need for an optical disc loading mechanism with better vibrational dampening mechanism.

OBJECT OF THE INVENTION

It is therefore an object of the present invention to provide a frame for an optical disc loader with improved vibration dampening features so that the optical disc may be rotated at higher speeds without experiencing substantial degradation in performance.

It is another object of the present invention to provide a frame for an optical disc loader with improved vibration dampening features which are easy to manufacture and implement into the loader.

SUMMARY OF THE INVENTION

The present invention is a floating frame for an optical disc loader. It includes a pivoting-type sub-chassis of 1-degree of freedom of movement. It is rigidly connected to a chassis without any floaters. Floaters are placed at the four corners of the chassis to support the entire loader. The floater has a wide mid-section and a narrow tip. Above the mid-section are upper slots, and below the mid-section are lower slots. The floater should preferably be made of flexible material such as rubber.

DETAILED DESCRIPTION OF THE INVENTION

As alluded to in the Background portion, the previous optical disc loaders utilized a floating sub-chassis to dampen the vibration generated by the traverse mechanism as it rotates an optical disc at high rotational speeds. The present invention, however, is a frame for an optical disc loader with a sub-chassis which is rigidly connected to a chassis without any floaters to support the sub-chassis. The floaters are instead provided on the outside of the chassis to "float" the entire loader.

Figure 1:
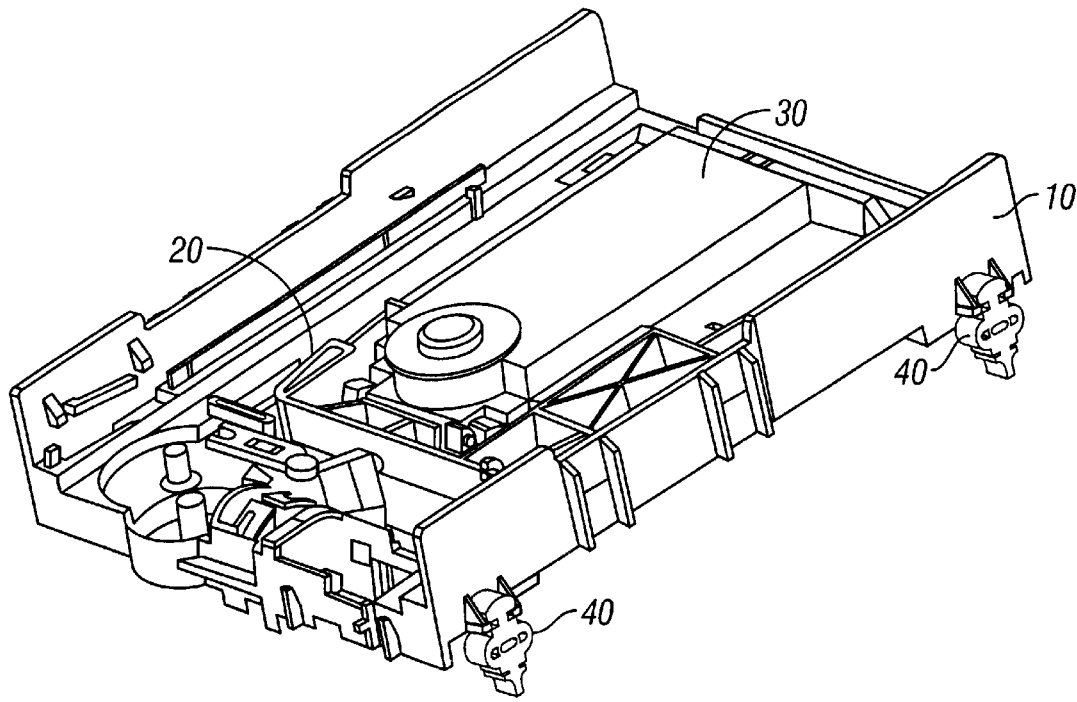
FIG. 1 is a perspective view of the floating frame for an optical disc loader with the improved vibration dampening features.
Figure 2:
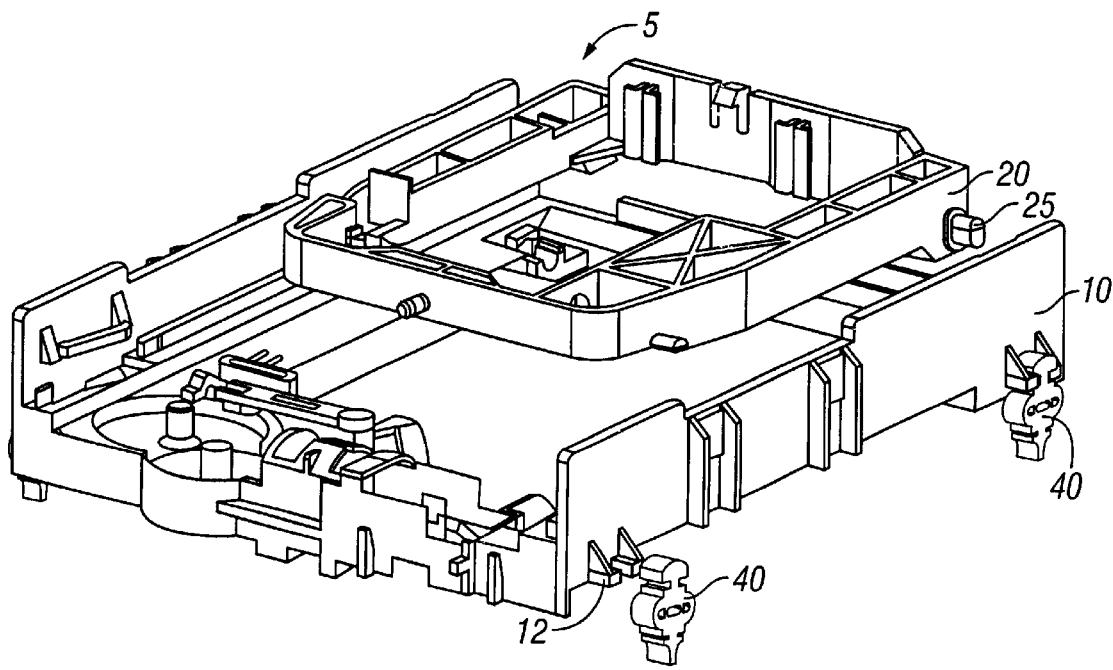
FIG. 2 is a perspective view of the optical disc of FIG. 1 with the sub-chassis and one of the floaters removed for better viewing.

FIGS. 1 and 2 illustrate the preferred embodiment of the present invention. Because the dampening features of the present invention may be implemented in virtually all types of currently-available optical disc drives, only the portions relating to the dampening features of the floating frame shall be described in detail. As can be seen in FIG. 1, the traverse mechanism 30 which rotates the optical disc is supported by the sub-chassis 20. As illustrated in this preferred embodiment, the sub-chassis 20 is of a pivoting type which rotates around the axis 25, and has only 1-degree of freedom. Unlike the existing optical disc drives, the sub-chassis 20 is rigidly connected to the chassis 10, that is, without any floaters floating the sub-chassis. This feature is important as it forces the vibration to be absorbed by the entire frame rather than just by the sub-chassis 20.

Figure 3:
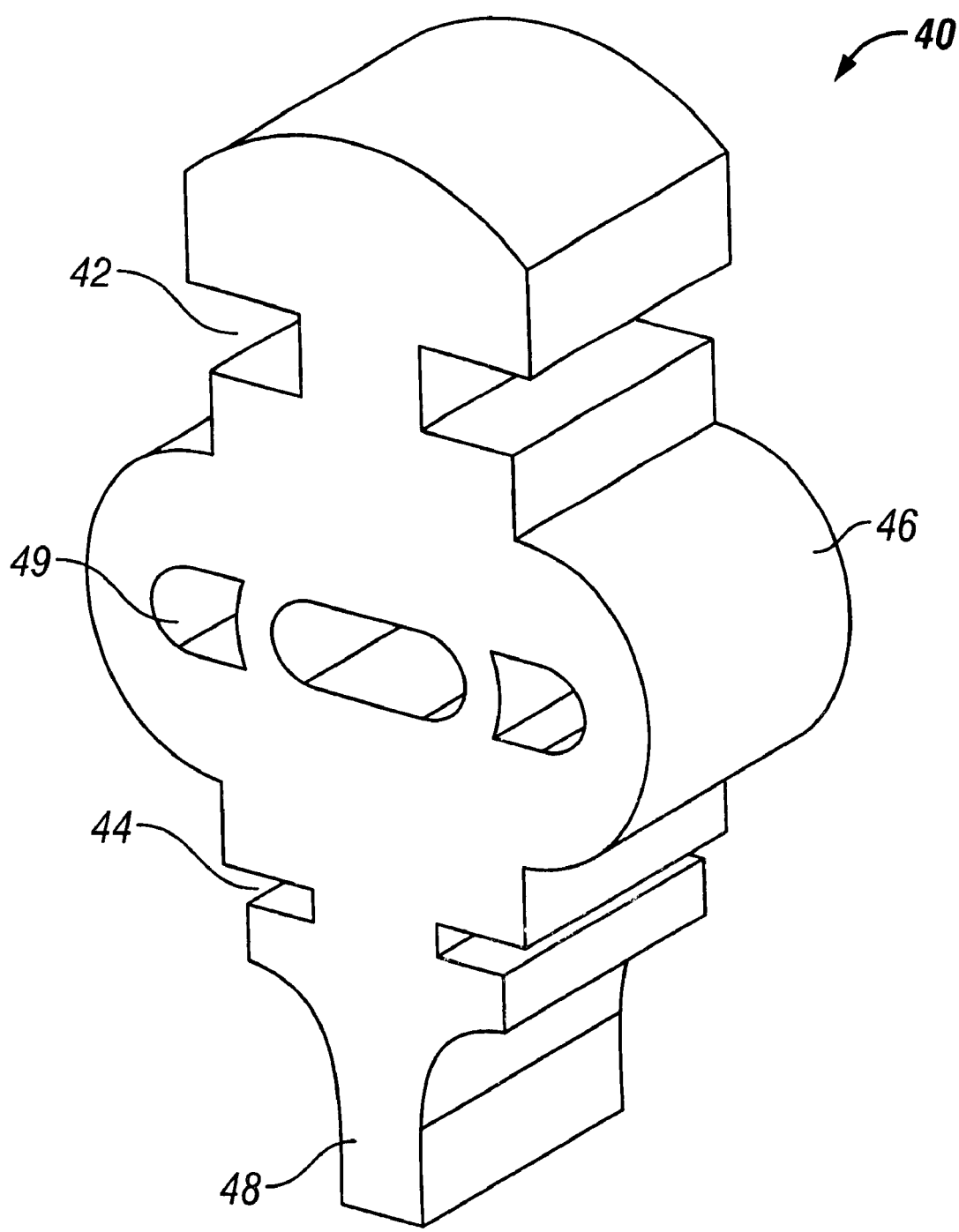
FIG. 3 is an enlarged perspective view of a floater.

To further reduce the vibration, floaters 40 are placed at the four corners of the chassis to support the entire loader. While it should be clear to those skilled in the art that the floaters can come in various form, the preferred shape is shown in FIG. 3. The floater 40 has a wide mid-section 46 and a narrow tip 48. Above the mid-section 46 are upper slots 42, and below the mid-section 46 are lower slots 44. Holes 49 are placed in the mid-section 46. The floater 40 should preferably be made of flexible material such as rubber. However, various flexible materials can be used as well.

Figure 4:
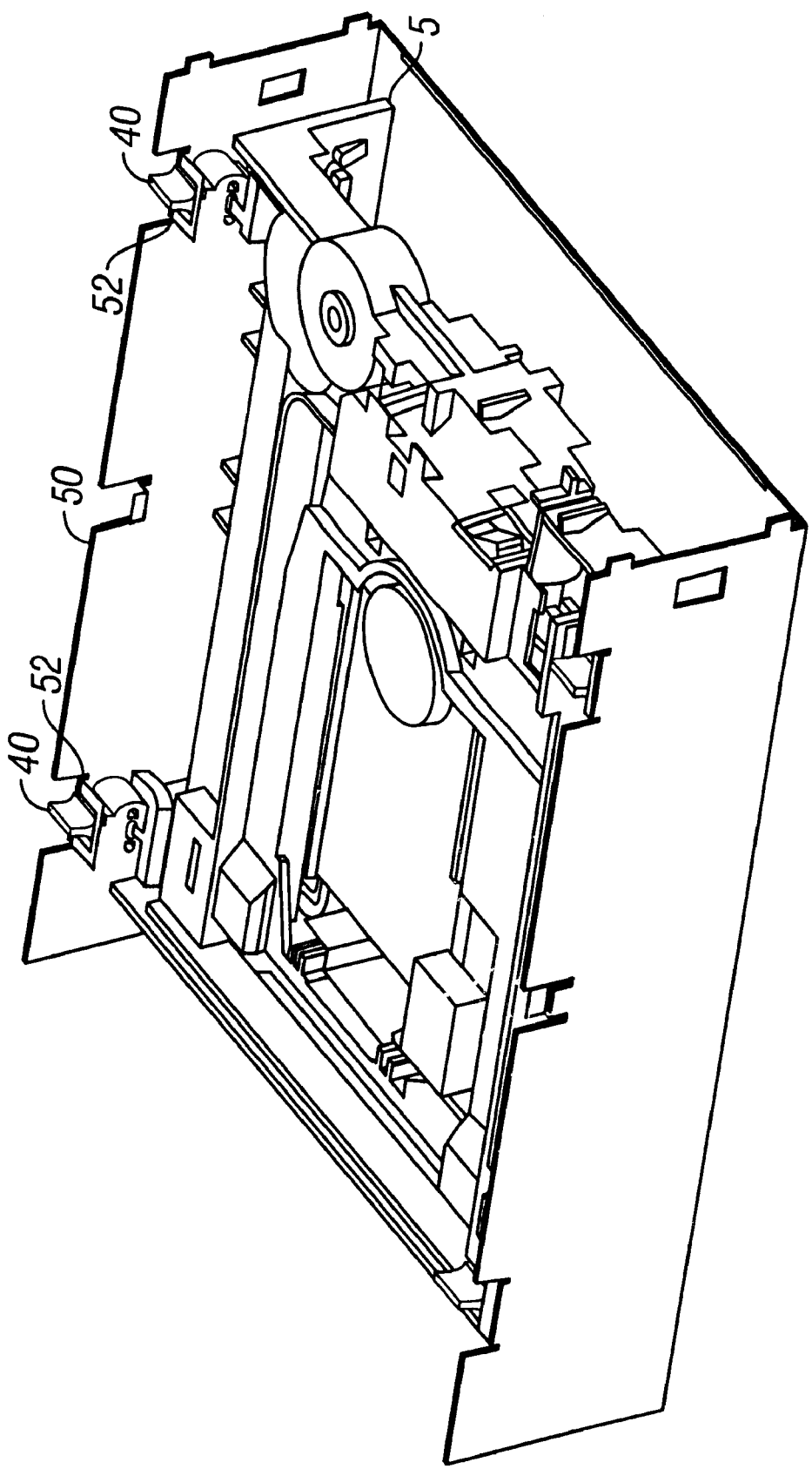
FIG. 4 is a perspective view of the optical disc loader of FIG. 1 mounted in an optical disc drive cover.

The slots 42 and 44 are important as they allow easy assembly with the frame of the optical disc loader. As can be seen from FIG. 2, the upper slots are mated with metal fins 12. The mating should be relatively snug to prevent inadvertent disengagement, but loose enough for the floater to easily slide into place. Once all of the floaters 40 are in place, the loader 5 can be positioned in place in an optical disc drive cover 50 as shown in FIG. 4. To properly mate with the floaters 40, the cover 50 should have corresponding metal bends 52 with a slit to accept the floaters 40. The slit should be wide enough to allow the tip 48 of the floater 40 to enter, but must be narrow enough to snugly mate with the lower slots 44.

It should be understood by those skilled in the art that while the preferred embodiment has been shown here as a way of fully disclosing the invention, many variations are possible without departing from the scope and spirit of the present invention. For instance, although a pivoting type sub-chassis was shown here, it should be understood that other types of sub-chassis may be used as well. In addition, although four floaters were shown here where they were attached to the four corners of the chassis, less than four floaters may be used and be attached to the chassis in other configurations so long as they perform the function of floating the loader. Many such modifications not mentioned herein are also possible. Accordingly, it is intended by the appended claims to cover all such modifications and changes as falling within the true spirit and scope of the present invention.

We claim:

1. A floating frame for an optical storage device loading mechanism comprising:

a chassis;

a sub-chassis rigidly connect to and disposed inside of said chassis, said sub-chassis adapted for supporting a traverse mechanism; and at least two floaters each comprising lower slots and upper slots, positioned outside of said chassis wherein the lower slots are received in corresponding metal bends in a host unit and the upper slots are mated with corresponding metal fins of the chassis, such that the floaters secure the chassis to a host unit, thereby allowing both the chassis and sub-chassis to float with respect to said host unit.

2. The floating frame as recited in claim 1 wherein said sub-chassis is of a pivoting-type having one degree of freedom.

3. The floating frame as recited in claim 1 wherein said floater is positioned at each of four corners of said chassis.

4. The floating frame as recited in claim 3 wherein said floater has an upper slot adapted for fittingly mating with said chassis.

5. The floating frame as recited in claim 4 wherein said floater further has a lower slot adapted for fittingly mating with an optical storage device drive cover.

6. The floating frame as recited in claim 5 wherein said floater has a wide mid-section, a narrow tip and holes in said mid-section.

7. The floating frame as recited in claim 5 wherein said floater is attached with said cover.

* * * * *